(12) United States Patent
Vaireaux

(10) Patent No.: US 11,453,356 B2
(45) Date of Patent: Sep. 27, 2022

(54) VEHICLE SUBASSEMBLY AND METHOD

(71) Applicant: Volvo Truck Corporation, Gothenburg (SE)

(72) Inventor: Frédéric Vaireaux, Reyrieux (FR)

(73) Assignee: Volvo Truck Corporation, Gothenburg (SE)

( * ) Notice: Subject to any disclaimer, the term of this patent is extended or adjusted under 35 U.S.C. 154(b) by 367 days.

(21) Appl. No.: 16/496,535

(22) PCT Filed: Mar. 31, 2017

(86) PCT No.: PCT/IB2017/000478
§ 371 (c)(1),
(2) Date: Sep. 23, 2019

(87) PCT Pub. No.: WO2018/178733
PCT Pub. Date: Oct. 4, 2018

(65) Prior Publication Data
US 2020/0269788 A1 Aug. 27, 2020

(51) Int. Cl.
*B60R 19/32* (2006.01)
*B62D 65/16* (2006.01)
*B60R 3/00* (2006.01)

(52) U.S. Cl.
CPC ............ *B60R 19/32* (2013.01); *B62D 65/16* (2013.01); *B60R 3/00* (2013.01)

(58) Field of Classification Search
CPC ......... B60R 19/32; B60R 19/26; B60R 19/30; B60R 19/56; B62D 65/16; B62D 25/08; B62D 33/077

(Continued)

(56) References Cited

U.S. PATENT DOCUMENTS 4,465,312 A   8/1984 Werner
7,431,384 B2 * 10/2008 Kapadia ............... B62D 25/082
                                                      296/203.02

(Continued)

FOREIGN PATENT DOCUMENTS

CN    101265934 A    9/2008
DE    102016222404 A1 *  5/2018

(Continued)

OTHER PUBLICATIONS

Izumi, Naruaki, Machine Translation of JP-2005289169-A Front Bumper Mounting Structure, Oct. 2005 (Year: 2005).*

(Continued)

*Primary Examiner* — Jason S Morrow
*Assistant Examiner* — Wenwei Zhuo
(74) *Attorney, Agent, or Firm* — Withrow & Terranova, PLLC

(57) ABSTRACT

The invention relates to a subassembly for a vehicle, the subassembly comprising a chassis (50) assembly and a front body module (10). The front body module (10) is attachable to a forward portion of the chassis (50) assembly. The front body module includes a side portion (20) which extends outwardly beyond the chassis in a transverse direction. A stay (40) is provided which extends transversely outwardly from the chassis assembly (50) to support the side portion. One of the front body module (10) or the stay (40) is provided with a connecting member (30) which extends in a substantially longitudinal direction. The other of the stay (40) or front body module is provided with a corresponding longitudinally aligned aperture (42) for receiving the connecting member in use to support the side portion (20) of the front body module (10). A method of assembly is also disclosed.

14 Claims, 3 Drawing Sheets

(58) Field of Classification Search
USPC .............. 293/134, 136, 154, 155; 296/187.1, 296/187.09, 193.09
See application file for complete search history.

(56) References Cited

U.S. PATENT DOCUMENTS

| | | | | |
|---|---|---|---|---|
| 9,266,485 | B2* | 2/2016 | Kuriyama | B62D 21/152 |
| 2003/0085579 | A1 | 5/2003 | Seksaria et al. | |
| 2003/0085592 | A1 | 5/2003 | Seksaria et al. | |
| 2006/0197347 | A1* | 9/2006 | Hoffman | B60R 19/56 |
| | | | | 293/102 |
| 2013/0328334 | A1* | 12/2013 | Hoiss | B60R 19/24 |
| | | | | 293/154 |
| 2014/0091585 | A1 | 4/2014 | Ramoutar et al. | |
| 2019/0351812 | A1* | 11/2019 | Jeon | B62D 21/09 |

FOREIGN PATENT DOCUMENTS

| | | |
|---|---|---|
| EP | 1754652 A1 | 2/2007 |
| GB | 295464 A | 8/1928 |
| JP | H02115737 U * | 9/1990 |
| JP | 2005289169 A * | 10/2005 |
| JP | 2005289169 A | 10/2005 |
| NL | 1032868 C2 | 5/2008 |
| WO | 02070327 A1 | 9/2002 |

OTHER PUBLICATIONS

International Search Report and Written Opinion for International Patent Application No. PCT/IB2017/000478, dated May 2, 2018, 15 pages.
First Office Action for Chinese Patent Application No. 201780087371.X, dated Jun. 24, 2022, 22 pages.

* cited by examiner

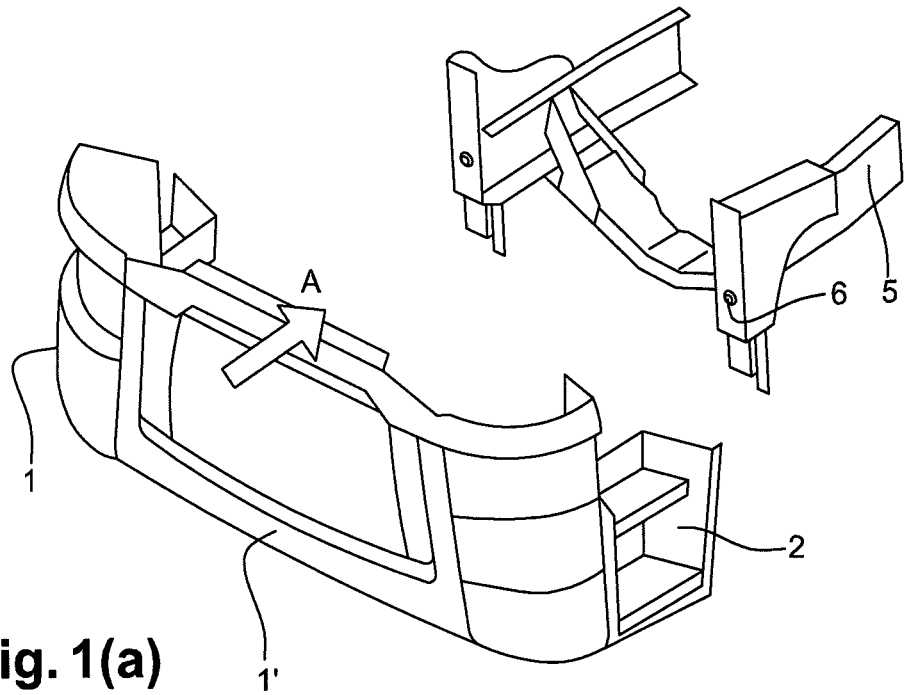
Fig. 1(a)
(prior art)
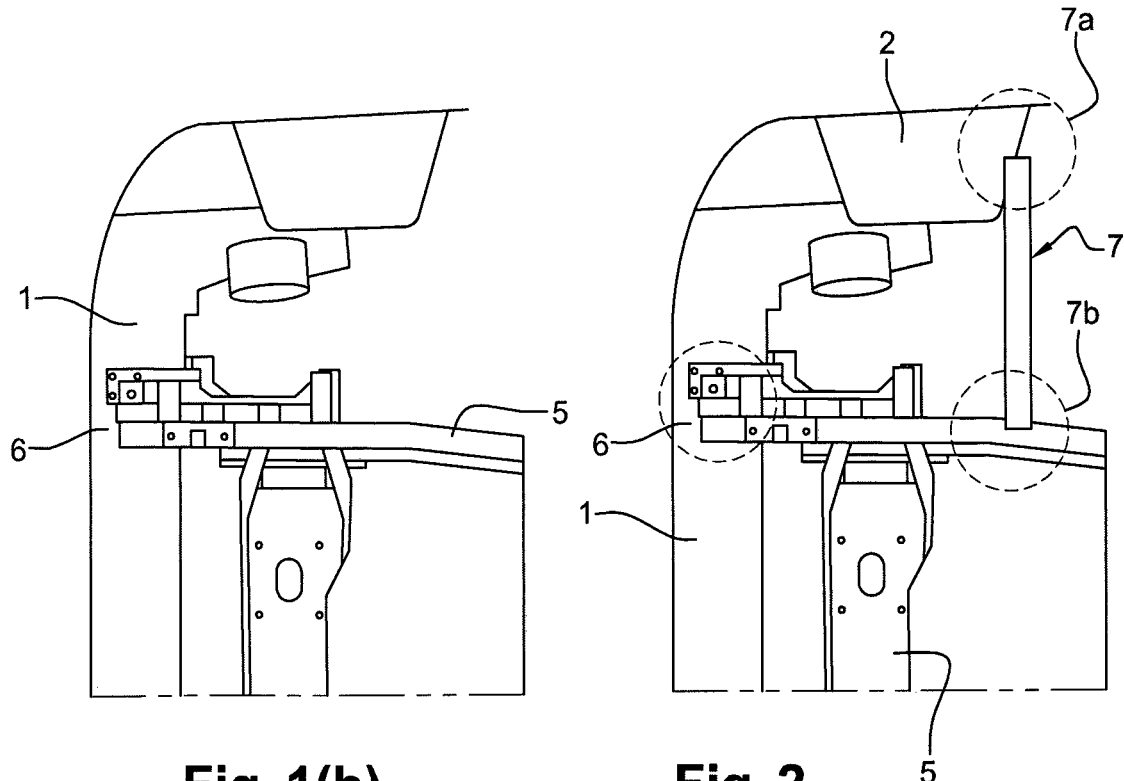
Fig. 1(b)
(prior art)
Fig. 2
(prior art)

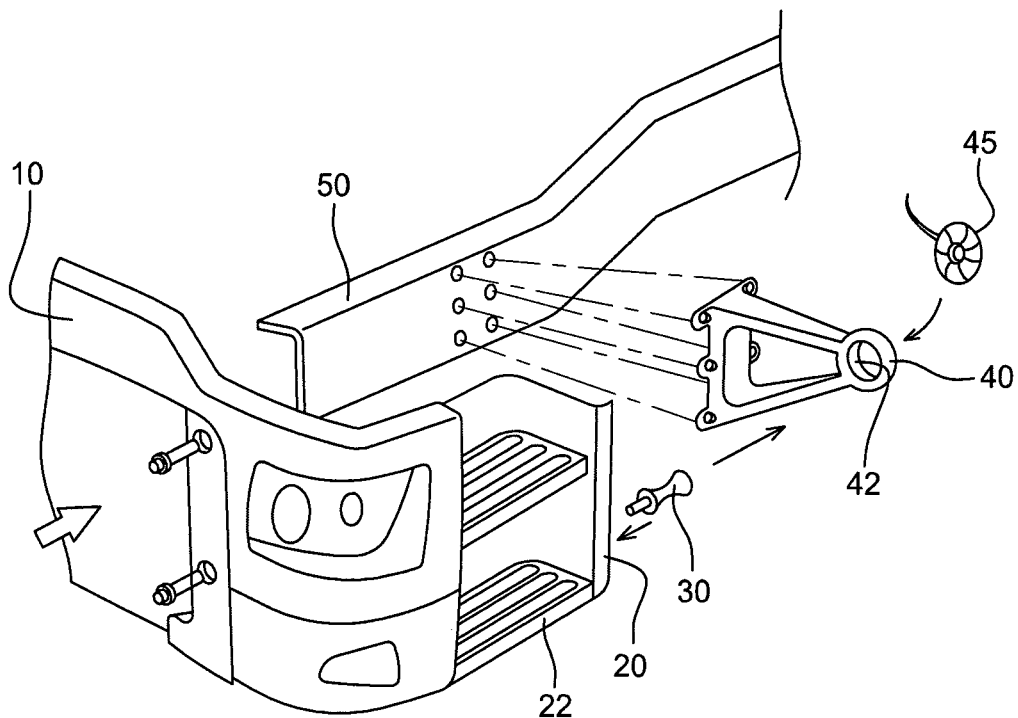
Fig. 3
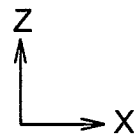
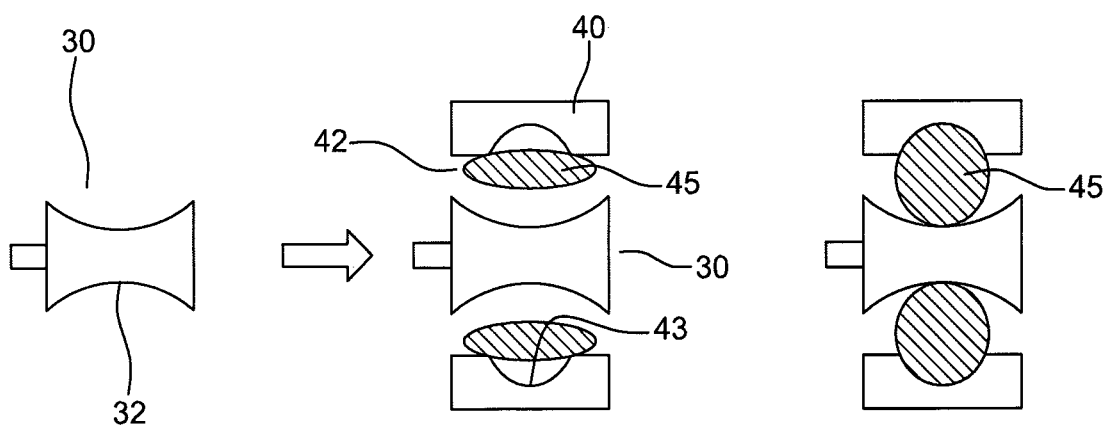
Fig. 4a  Fig. 4b  Fig. 4c

VEHICLE SUBASSEMBLY AND METHOD

This application is a 35 USC 371 national phase filing of International Application No. PCT/IB2017/000478, filed Mar. 31, 2017, the disclosure of which is incorporated herein by reference in its entirety.

TECHNICAL FIELD

The invention relates to an assembly for a vehicle assembly. Particularly, but not exclusively, the invention relates to a front body assembly for a vehicle.

The invention can be applied in heavy-duty vehicles, such as trucks, buses and construction equipment. Although the invention will be described with respect to a truck, the invention is not restricted to this particular vehicle, but may also be used in other vehicles such as cars or vans.

BACKGROUND

As shown in FIG. 1, when manufacturing a vehicle, such as a truck, it is desirable to have an assembly procedure in which a front body module 1 (which may for example include at least a front bumper 1') is provided as a preassembled module which can be attached as a unit to a chassis 5 of the truck. Conveniently, the module 1 may be configured such that it can be connected to the chassis 5 by being presented in a longitudinal direction (as shown by arrow A) from the front of the truck and bolted into position at a convenient interface location 6.

A difficulty of such an arrangement is that the outermost side portions 2 of the front module 1 may extend substantially beyond the connection location 6 with the chassis 5 in the lateral direction. This may result in vibration issues due to the level arm from the connection location. Such vibrations could lead to durability issues or effect perceived quality. Such problems may be particularly significant in heavy-duty vehicles such as trucks in which the front body module may include lateral steps, for user entry/exit from the vehicle. Such steps are generally positioned at, or proximal to, the outermost portions of the front body module.

A further difficulty in supporting the lateral portions of the front module is accommodating the build up of tolerances from the chassis, front face and lateral steps. This provides a need to allow some flexibility and/or adjustability into the stay arrangement.

SUMMARY

An object of embodiments of the invention is to provide an improved apparatus and/or method which enables the front body module to be attached to the chassis in a convenient and efficient manner and which also ensures that vibration of the lateral portions is reduced or minimised.

According to a first aspect of the invention, the object may be achieved by a vehicle subassembly according to claim 1.

According to a second aspect of the invention the object may be achieved by a vibration isolating support for a vehicle structure according to claim 12.

According to a third aspect of the invention the object may be achieved by a support for a vehicle structure according to claim 13.

According to a fourth aspect of the invention, the object may be achieved by a method according to claim 14.

Typically, the front body module will be provided with the longitudinally extending connecting member and the stay will be provided with the aperture. Thus, the connecting member may extend rearwardly from a side portion of the front module.

25 It will be appreciated that the longitudinal direction corresponds to the longitudinal direction of the chassis which in turn generally defines the longitudinal direction of the vehicle.

It will be appreciated that embodiments of the invention may typically utilise a plurality of supports. For example, a pair of supports may be disposed on opposing sides of the vehicle chassis to support side portions of a front module on each side of the vehicle.

The front body module may include at least a front bumper. The front body module may optionally include other pre-assembled components for example, headlights and/or a front 35 grill and/or external trim panels.

Embodiments of the invention provide a simple support arrangement for the side portions of the front body module. Advantageously, the support arrangement may enable the connection between the stray and the front module to be made by a simple linear longitudinal motion of bringing the parts together. This may enable the stay to be connected with minimal additional manufacturing steps as the stay and front body may be connected simultaneously with the main connection between the chassis and front body portion. In embodiments of the invention the stay and connection may have the further advantage of being self aligning. This may assist in accommodating the build up of manufacturing tolerances.

According to a further embodiment, the stay may comprise an aperture. The rearwardly projecting member may comprise a pin configured to be received in the aperture. An advantage of a complimentary pin and aperture arrangement is that the arrangement may provide a simple attachment arrangement.

The aperture may be generally aligned with the longitudinal direction of the chassis. Accordingly, in use the pin is inserted into the aperture by relative longitudinal movement between the chassis and front body module. This arrangement provides the advantage of enabling the lateral support arrangement to be engaged by simply moving the front body module into alignment with the chassis from the front of the chassis. This may for example be done as part of the manufacturing step of connecting the front module to the chassis (in other words the connection of the stays is simultaneously/automatically made when the front module is correctly aligned with the chassis).

The subassembly may further comprise a vibration isolator. For example the stay may include a vibration isolator. The vibration isolator may for example be a flexible portion of the stay. The flexible portion may be integrally formed. The flexible portion could, for example, be an elastomer portion formed on or in the stay.

Alternatively or additionally, the vibration isolator may comprise an inflatable member. The inflatable member may be disposed between the aperture and pin. The inflatable member may be initially deflated to allow the connection of the components and then be inflated once the components are aligned and connected.

The anti-vibration effect of the inflatable member may depend upon its inflation pressure and/or material. The inflatable member may be connected to the air supply (particularly on a heavy-duty vehicle such as a truck). This provides an advantage in that the inflatable member may be inflated when the vehicle is in use. The inflation of the member may be variable and may for example be adjusted (for example by a controller of or associated with the vehicle) to provide damping of particular vibrations that might occur at a specific condition of use.

The inflatable member may be an annular bushing. Thus, the inflatable member may be positioned within the aperture and substantially surround the pin. The pin may be provided with a concave outer profile in the longitudinal direction to enable alignment of the inflatable member. The aperture may also have a concave profile in the longitudinal direction to provide a seat for the inflatable member. The pin and aperture may be provided with concave surfaces which, in the assembled position are opposed to provide an annular recess for the inflatable member.

In other embodiments, the pin may be inwardly tapered towards its tip. For example, the pin may have a substantially conical outer profile (for example it may be frusto-conical). The aperture may extend from a forward opening having a first diameter and tapers inwardly in the longitudinal direction to a reduced diameter. For example the aperture may have a complimentary female profile to the tapered pin. The aperture may for example have a substantially conical internal profile. Advantageously, the provision of a forwardly tapered pin and/or aperture may provide a self aligning arrangement which will enable the assembly to accommodate tolerances in the build.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIGS. 1(a) and 1(b) illustrate a typical front module and chassis subassembly for a truck;

FIG. 2 shows a detailed section illustrating the lateral sides;

FIG. 3 is a subassembly in accordance with a first embodiment of the invention;

FIG. 4a-c schematically illustrate the detailed assembly of an inflatable connection in accordance with the embodiment of FIG. 3, with FIG. 4a showing the section before inflating and FIG. 4c showing the section after inflating, in the module assembly.

DETAILED DESCRIPTION OF EXAMPLE EMBODIMENTS OF THE INVENTION

Figure 5:
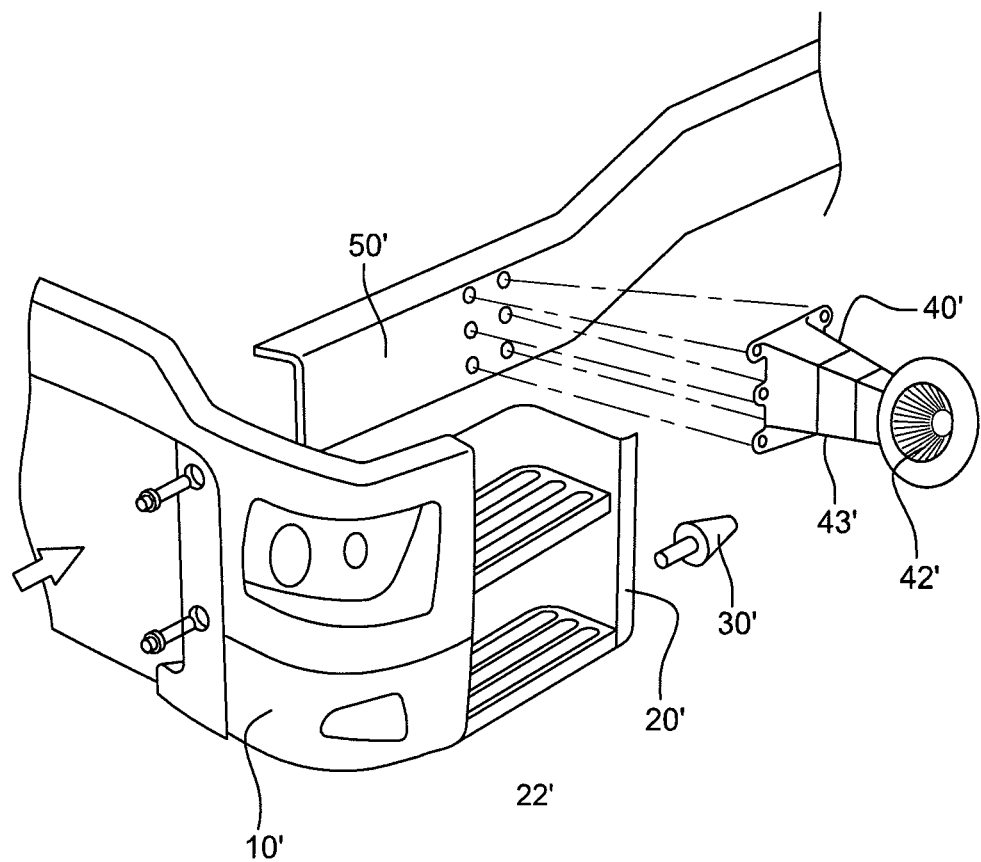
FIG. 5 is a subassembly in accordance with a second embodiment of the invention.

It will be appreciated that the longitudinal direction X of a vehicle is defined by its driving direction in use and that the chassis of the vehicle generally extends in the same longitudinal direction along the vehicle. Thus references to front or rear (and forward or rearward) will be readily understood by the skilled person to generally correspond to those directions on the final vehicle. Likewise references to the transverse direction or to a side will be readily understood to be broadly interpreted in consistency with the directions relative to the final vehicle in use. Z is the vertical direction.

As explained above, when manufacturing a vehicle, such as a truck, it is desirable to have an assembly procedure in which a front body module 1 is preassembled as a module (for example off the main assembly line) prior to being connected to the chassis 5 of the unit at the appropriate stage of the assembly process. Ideally, the front module 1 is presented to the chassis 5 from the forward end only in a simple longitudinal relative positioning/alignment movement and is then connected from the front face.

Ideally, the connection between the chassis 5 and the front module 1 is provided by a simple bolting at a forward face interface location 6. A difficulty of such arrangements is that the side portions 2 of the front module 1 is not directly supported and has a relatively large lever arm to the connection point 6. This is a particular problem for heavy-duty vehicles such as trucks because the side portions 2 are generally provided with steps for entry/exit of the vehicle and, therefore, the strength and weight of the side portion is generally increased.

To address this issue it may be possible to add a lateral support member 7 (referred to herein as a "stay") as shown in FIG. 2. The stay 7 bridges the gap between the chassis 5 and side portions 2 by extending outwardly from the chassis 5 at a location rearwardly of the front portion of the chassis to meet the outer portions 2 of the front module 1. The stay 7 may be attached in a subsequent assembly step after the front module 1 has been attached to the chassis 5, but this provides a disadvantage of further complicating the assembly process. For example, at least two additional connections may need to be made on each stay at connection locations 7a and 7b at either end of the stay 7. A further issue with a bolted stay is that the build up of geometric tolerances in the chassis 5, front module 1 and side portions 2 will need to be accommodated. This requires a degree of flexibility or adjustability to be provided in the stay 7 and its connections 7a, 7b.

Thus, as shown in FIGS. 3 to 5, the applicants have now proposed an arrangement in which the subassembly of the front module 10 and chassis 50 is arranged to allow assembly in a simplified manner whilst still reducing vibrations in the side portion.

A forward portion of the chassis 50 has a front face onto which the front module 10 is aligned and fastened during a manufacturing step. The front body module 10 includes a bumper which typically extends across the full front width of the vehicle and at least partially around the side. In the illustrated example the vehicle is a truck, as such the side portions 20 of the front body module 10 are provided with steps 22 for entry/exit from the cabin.

In accordance with embodiments of the invention a stay 40 is provided on the side of the chassis 50. The stay 40 extends in a transversely outward direction in a cantilever manner. In the embodiment shown in the figure the stay 40 has a generally triangular structure but it will be appreciated that other shapes or forms may be suitable. The stay would generally be pre-assembled onto the chassis 50 during in-line manufacturing (and prior to the attachment of the front module 10). The free end of the stay 40 is provided with a connecting aperture 42. The longitudinal axis of the aperture is generally aligned with the longitudinal direction of the chassis/vehicle.

The front body module 10 is provided with a connecting member 30 in the form of a pin which extends rearwardly from the side portion 20 of the module 10. The pin could be removably attached to the body module or may alternatively be integrally formed (for example as part of a moulding used in the body module). The longitudinal axis of the pin 30 is generally aligned with the longitudinal direction of the chassis/vehicle.

It will be appreciated that due to the alignment of the aperture 42 and pin 30 the pin may be easily positioned within the aperture 42 by positioning the front module 10 on the forward end of the chassis 50 with a simple longitudinal movement.

As best seen in FIG. 4b, the minimum internal diameter of the aperture 42 is greater than the maximum external diameter of the pin 30. Thus, there is an annular clearance gap between the aperture 42 and pin 30. This helps to allow easy positioning of the pin 30 within the aperture 42 even when manufacturing tolerances adversely affect the alignment.

An intermediate inflatable member 45 is provided to be positioned between the pin 30 and the aperture 42. The intermediate inflatable member 45 has a generally toroidal shape when inflated. The inflatable member 45 is used as an inflatable bushing between the aperture 42 and pin 30. In order to accommodate and position the inflatable member 45 the pin 30 and aperture 42 may both be provided with a concave profile to provide opposing seats 32, 43 in which the inflatable member 45 is positioned. As such, when the pin 30 is positioned within the aperture 42 an annular space is defined which substantially radially surrounds the pin 30. As will be explained below by inflating the member 45 it fills the space between the pin 30 and aperture 42.

The assembly process will now be described in sequence. Initially the inflatable member 45 is not inflated. The front module 10 is presented to the chassis 50 in a longitudinal movement and is bolted in place at a suitable location on the front face. As this is carried out the pin 30 will slide into the aperture 42. The inflatable member 45 may have been pre-positioned in the aperture 42 or may be positioned between the aperture 42 and pin 30 after connection of the front face. The inflatable member 45 is attached to the truck air supply. At the end of the truck assembly, the inflatable member 45 is inflated. The space between the pin 30 and aperture 42 are filled all around the instep extension regardless of the geometrical tolerances thanks to the deformability of the inflatable member 45. The inflated bushing 45 compresses the pin 30 and generates a firm connection with the stay 40. This connection is not fully rigid but softened by the inflatable bushing 45. The recessed profile of the pin 30 is such that when it tends to move, the compression of the inflatable bushing 45 will increased resulting in the connection being retained. Advantageously, the inflatable member 45 is referred to a vibration isolator as it ensures that vibrations of the steps are damped or filtered but the assembly process is still only in longitudinal direction with bolts on the front face only.

The air pressure inside the inflatable bushing 45 and/or the bushing material characteristics (for example the elasticity) can be adapted to different vehicle architectures and road conditions in order to have the best vibrations filtering in any case.

The stay arrangement of this embodiment is intended to filter vibrations but does not necessarily need to support the insteps for entry/exit load cases. This means that the insteps need to be strong enough to withstand these load cases. As an example, the insteps need to be usable for entry/exit even if the air supply is off.

An alternative embodiment of the invention is shown in FIG. 5. This embodiment does not include the inflatable member 45. The stay 40' is instead provided with an integral flexible section 43' (for example formed of a different material). The flexible section 43' is disposed between the chassis 50' and the aperture 42' for connection to the side portion 20' of the front body module 10'.

As with the previous embodiment, the stay 40' is fixed on the chassis 50' during early phase frame preparation. After pre-assembly out of the line, the full lower front module 10' is presented to the truck in longitudinal direction. The pin 30' is inserted into the aperture 42' during this assembly.

Both the pin 30' and the aperture 42' are formed with corresponding tapered profiles. This ensures that the pin and aperture are self-aligning when assembled in the longitudinal direction. The reduced diameter tip of the pin 30' will initially enter the maximum diameter forward end of the aperture 42'. As the front module 10' (and therefore the pin 30') is moved rearwardly relative to the chassis 50', the side faces of the pin 30' and aperture 42' will draw the connecting elements together (resulting in some possible deflection of the flexible portion 43' if necessary).

It can be seen in the illustrated embodiment that a substantially conical profile for both the male member, i.e. pin 30', and the aperture, 42', may be provided. The conical shape enables a good connection between the instep extension and the stay.

Once assembled the flexible portion 43' of the stay 40' is able to filtering the vibrations of the insteps (and is therefore also referred as a vibration isolator) but the assembly process is still only in longitudinal direction with bolts on the front face only.

The skilled person will appreciate that whilst a single sided embodiment has been described above for clarity purposes, the forward module may typically be substantially identical on each side. As such, a pair of (typically substantially identical) stay arrangements may be provided on either side of the vehicle.

Advantages of embodiments of the invention (whether using the tapered pin or inflatable member embodiment) include:
  Full lower front module assembly in longitudinal direction with bolts only on front face. Compatible with manufacturing requirement for assembly efficiency and operator ergonomics.
  Insteps vibrations are filtered. This will enable to increase durability and perceived quality feature levels.
  The flexible parts characteristics (bushing air pressure and material for first embodiment and flexible part material for second embodiment) can be tailored/adapted to different trucks architectures and road conditions in order to have the optimum vibrations filtering in any case It is to be understood that the present invention is not limited to the embodiments described above and illustrated in the drawings; rather, the skilled person will recognize that many changes and modifications may be made within the scope of the appended claims.

The invention claimed is:

1. A subassembly for a vehicle, the subassembly comprising:
  a chassis assembly;
  a front body module attachable to a forward portion of the chassis assembly, the front body module including a side portion thereof which extends outwardly beyond the chassis in a transverse direction; and characterised in that
  a stay is provided which extends transversely outwardly from the chassis assembly to support the side portion, wherein
  one of the front body module or the stay is provided with a connecting member which extends in a substantially longitudinal direction and the other of the stay or front body module is provided with corresponding longitudinally aligned aperture for receiving the connecting member in use to support the side portion of the front body module; and a vibration isolator positioned in the aperture.

2. The subassembly of claim 1, wherein the stay comprises an aperture and the connecting member is a rearwardly projecting member on the front body module comprising a pin configured to be received in the aperture.

3. The subassembly of claim 2, wherein the aperture is generally aligned with the longitudinal direction of the chassis such that in use the pin is inserted into the aperture by relative longitudinal movement between the chassis and front body module.

4. The subassembly of claim 2, wherein the vibration isolator comprises an inflatable member disposed between the aperture and pin.

5. The subassembly of claim 4, wherein the inflatable member comprises an annular bushing.

6. The subassembly of claim 4, wherein the pin and aperture are provided with concave surfaces which, in the assembled position are opposed to provide an annular recess for the inflatable member.

7. The subassembly of claim 1, wherein the subassembly resides in a truck, and the side portion of the front body module includes a step.

8. A vibration isolating support for a vehicle structure, the support comprising: a first component having an aperture and a second complimentary component having a pin configured to be received within the aperture; and characterised in that an inflatable bushing is disposed between the aperture and the pin.

9. A method of manufacturing a vehicle subassembly, the subassembly comprising a chassis and a body module configured to be attached to a forward portion of the chassis assembly, and characterised in that the method comprises: positioning a connecting member on one of the body module or chassis within an aperture of a support of the other of the chassis or body module; providing an inflatable bushing between the connecting member and aperture; and inflating the inflatable bushing.

10. The subassembly of claim 1, wherein the vibration isolator comprises a deformable vibration isolator.

11. The subassembly of claim 1, wherein the vibration isolator dampens vibrations between the stay and the connecting member.

12. The subassembly of claim 1, wherein the vibration isolator filters vibrations between the stay and the connecting member.

13. The subassembly of claim 1, wherein the vibration isolator reduces rigidity of the support of the side portion of the front body module provided by the stay and the connecting member.

14. The subassembly of claim 1, wherein the vibration isolator softens a connection of the stay and the connecting member.

* * * * *